(12) United States Patent
Wurmfeld et al.

(10) Patent No.: US 9,965,715 B2
(45) Date of Patent: May 8, 2018

(54) TAMPER-RESISTANT TRANSACTION CARD AND METHOD OF PROVIDING A TAMPER-RESISTANT TRANSACTION CARD

(71) Applicant: Capital One Services, LLC., McLean, VA (US)

(72) Inventors: David Wurmfeld, Fairfax, VA (US); James Zarakas, Centreville, VA (US); Theodore Markson, Reston, VA (US); Saleem Sangi, Ellicott City, MD (US); Tyler Locke, Washington, DC (US); Kevin Kelly, Austin, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days. days.

(21) Appl. No.: 15/377,272

(22) Filed: Dec. 13, 2016

(65) Prior Publication Data

US 2017/0098150 A1    Apr. 6, 2017

Related U.S. Application Data

(63) Continuation of application No. 15/098,903, filed on Apr. 14, 2016, now Pat. No. 9,710,744.

(60) Provisional application No. 62/270,449, filed on Dec. 21, 2015, provisional application No. 62/147,568, filed on Apr. 14, 2015.

(51) Int. Cl.
*G06K 19/02* (2006.01)
*G06K 19/073* (2006.01)
*G06K 19/077* (2006.01)

(52) U.S. Cl.
CPC . *G06K 19/07381* (2013.01); *G06K 19/07722* (2013.01)

(58) Field of Classification Search
CPC ........... G06K 19/077; G06K 19/07381; G06K 19/06037
USPC .................................. 235/488, 492
See application file for complete search history.

(56) References Cited

U.S. PATENT DOCUMENTS

| | | | |
|---|---|---|---|
| 6,758,404 | B2 | 7/2004 | Ladyansky |
| 7,090,139 | B2 | 8/2006 | Kasuga et al. |
| 7,901,977 | B1 | 3/2011 | Angelopoulos et al. |
| 8,522,051 | B2 | 8/2013 | Hankhofer et al. |
| 2001/0056542 | A1 | 12/2001 | Cesana et al. |
| 2003/0024994 | A1 | 2/2003 | Ladyansky |

(Continued)

FOREIGN PATENT DOCUMENTS

WO    2001/026180    4/2001

OTHER PUBLICATIONS

Notification of Transmittal of The International Search Report and The Written Opinion of the International Searching Authority from Application No. PCT/US2016/027476 dated Jul. 18, 2016.

*Primary Examiner* — Ahshik Kim
(74) *Attorney, Agent, or Firm* — Hunton & Williams LLP

(57) ABSTRACT

A dynamic transaction card that is manufactured using conductive plastic jumpers that will dissolve when in contact with a solvent used to tamper with the dynamic transaction card. Internal components of a dynamic transaction card may be manufactured using a synthetic or semi-synthetic organic material, such as, for example, plastics. These materials may be conductive to provide functionality to a dynamic transaction card, such as a connection between an integrated circuit and other card components such that when the materials dissolve, the connections are broken and the dynamic transaction card may be inactive due to the loss of various connections.

12 Claims, 3 Drawing Sheets

(56) References Cited

U.S. PATENT DOCUMENTS

2003/0029557 A1 2/2003 Hwang
2014/0346685 A1 4/2014 Afzali-Ardakani et al.

TAMPER-RESISTANT TRANSACTION CARD AND METHOD OF PROVIDING A TAMPER-RESISTANT TRANSACTION CARD

CROSS REFERENCE TO RELATED APPLICATIONS

This application is a Continuation of U.S. application Ser. No. 15/098,903 filed Apr. 14, 2016, which claims the benefit of provisional U.S. Application No. 62/270,449 entitled "Tamper Resistant Smart Card and Method of Providing a Tamper-Resistant Smart Card" filed Dec. 21, 2015; and U.S. Provisional Application No. 62/147,568, filed Apr. 14, 2015. The entire contents of these applications are incorporated herein by reference.

This application is related to, and U.S. application Ser. No. 15/098,935, entitled "Dynamic transaction card Power Management" filed Apr. 14, 2016, which claims the benefit of U.S. Provisional Application No. 62/266,324, filed Dec. 11, 2015, U.S. Provisional Application No. 62/270,307 filed Dec. 21, 2015, and U.S. Provisional Application No. 62/305,599, filed Mar. 9, 2016. The entire contents of these applications are incorporated herein by reference.

FIELD OF THE DISCLOSURE

The present invention relates to a dynamic transaction card that is manufactured using conductive plastic jumpers that will dissolve when in contact with a solvent used to tamper with the dynamic transaction card.

BACKGROUND OF THE DISCLOSURE

Smart cards may store confidential information and may include proprietary information and/or engineering know how. Protecting an individual and/or company from having this information and know how leaked is of the utmost importance when a smart card is associated with a financial institution. Currently, there is little to no protection for this information.

These and other drawbacks exist.

SUMMARY OF THE DISCLOSURE

Various embodiments of the present disclosure provide a dynamic transaction card that is manufactured using conductive plastic jumpers that will dissolve when in contact with a solvent used to tamper with the dynamic transaction card. A dynamic transaction card may include an embedded microprocessor chip, or integrated circuit (IC), having various components to provide card capabilities, such as transaction capabilities, security capabilities, and reprogramming capabilities. se components may be understood to refer to computer executable software, firmware, hardware, and/or various combinations thereof. A dynamic transaction card may include a number of layers including a transparent overlay and backing that encapsulate a number of components, both hardware and software, such as, for example, potting, Java Applets, Java Applet integration, a EuroPay-MasterCard-Visa ("EMV") chip, a sensor, a display, display driver, firmware, a bootloader, a microcontroller an antenna, an energy storage component, power management, a flexible PCB, and a chassis.

Internal components of a dynamic transaction card may be manufactured using a synthetic or semi-synthetic organic material, such as, for example, polyethylene terephthalate, polyethylene, high-density polyethylene, polyvinyl chloride, polyvinylidene chloride, low-density polyethylene, polypropylene, polystyrene, high impact polystyrene, polyamides, acrylonitrile butadiene styrene, polyethylene/acrylonitrile butadiene styrene polycarbonate, and/or polycarbonate/acrylonitrile butadiene styrene. These materials may be conductive to provide functionality to a dynamic transaction card, such as a connection between an integrated circuit and other card components such that when the materials dissolve, the connections are broken and the dynamic transaction card may be inactive due to the loss of various connections.

A dynamic transaction card that includes these conductive, plastic jumpers connecting, for example, an integrated circuit to a power supply, may be manufactured using reaction injection molding (RIM). In this manner, thermosetting polymers (e.g., plastics) are cured irreversibly. As used herein, irreversible curing means that once hardened, the resin cannot be reheated, melted, and reshaped. Using a RIM process, the various polymer components used to form the conductive, plastic jumpers in a dynamic transaction card may be combined and injected into a molding. Reinforcing agents may be added to the mixture, such as various fibers or mica. The materials mixed in the molding may then be cured while remaining in the molding.

Once cured, the molded jumpers may then be incorporated into a dynamic transaction card as connectors between, for example, an integrated circuit and logic, and a power supply or power management. Should the card be tampered with using, for example, a solvent to dissolve the plastic outer layers of the dynamic transaction card, the jumpers will also dissolve thereby preventing reverse engineering of or tampering with the dynamic transaction card.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving a dynamic transaction card that is manufactured using conductive plastic jumpers that will dissolve when in contact with a solvent used to tamper with the dynamic transaction card. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only. For example, many other account providers or smart card providers may exist, such as retail stores, transportation providers (e.g., a fare card), a housing provider, and the like.

Additionally, a dynamic transaction card is used as an example of a card with an embedded microprocessor chip. A dynamic transaction card may include any type of card with common or programmable logic or an embedded microprocessor chip including, for example, cards used in transportation systems, hotel systems, and the like.

Figure 1:
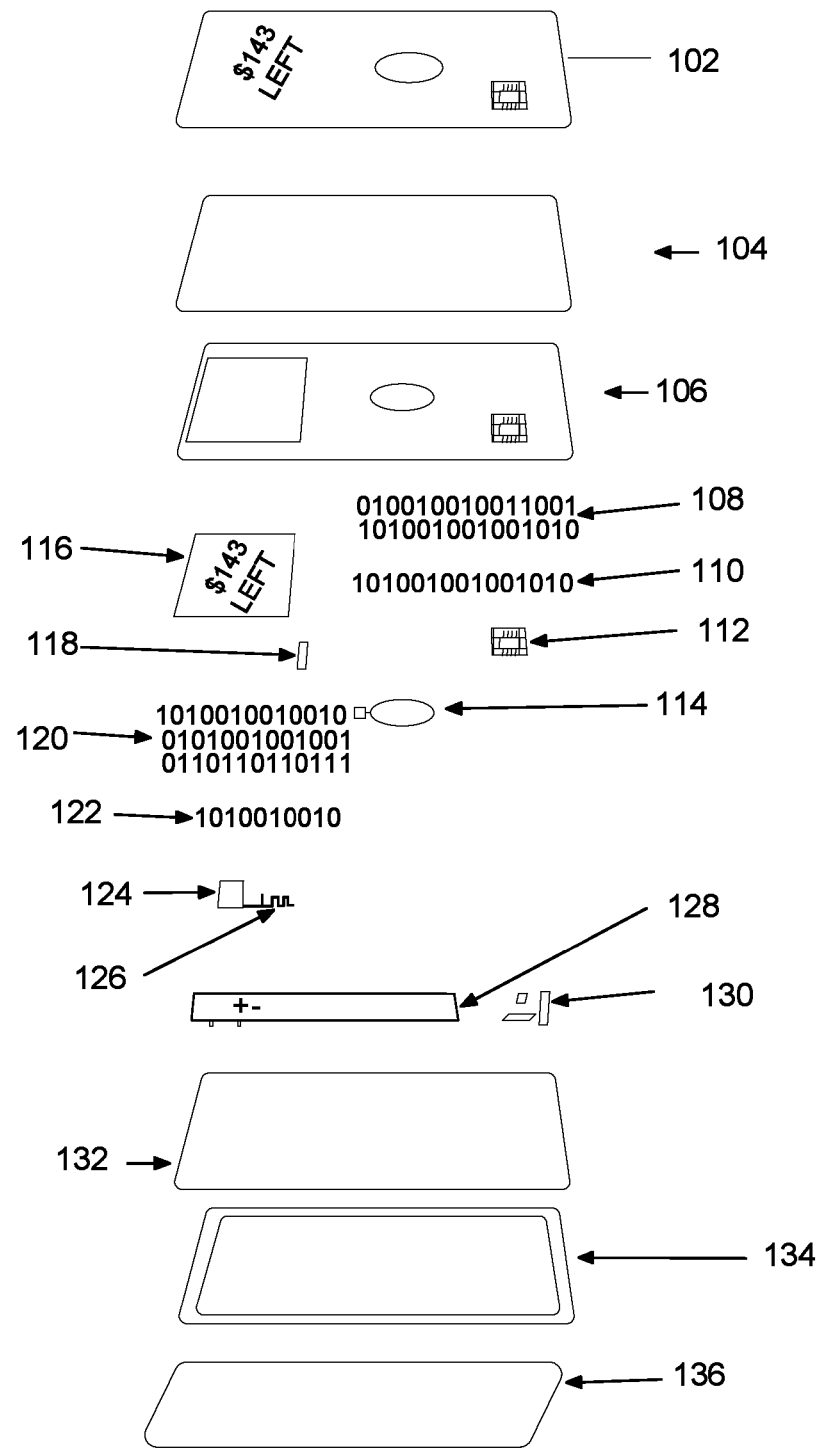
FIG. 1 depicts an example embodiment of a dynamic transaction card according to embodiments of the disclosure.

FIG. 1 depicts an example dynamic transaction card 100. For example, dynamic transaction card may include a dynamic transaction card as described in U.S. Provisional Application No. 62/147,568, the entire contents of which are incorporated by reference herein. As shown in FIG. 1, dynamic transaction card 100 may include a top output layer 102. The top output layer may be a film covering, a plastic covering, and/or the like. The top output layer 102 may be constructed of scratch-resistant and/or scratch-proof materials. Materials that may be used as a top outer layer 102 may include polyvinyl chloride (PVC), polylactic acid (PLA), acrylonitrile butadiene styrene (ABS), polyethylene terephthalate (PET), Polyethylene terephthalate glycol-modified (PET-G), Mylar, composites including carbon, Kevlar, ceramic, fiberglass, wood, metal, ornamental thin material, and/or the like. A dynamic transaction card 100 may further include a top protective layer 104, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass material, PVC, PET, and/or PET-G.

A dynamic transaction card 100 may include a potting 106 or filler epoxy around the electrical components to provide strength and/or water resistance. A potting 106 may include a light guide, which may be constructed of optical grade materials such as acrylic, resin, polycarbonate, epoxies, and/or glass. Potting 106 may also include injection molding, such as over molding and/or multi-shot to encapsulate the internal components of card 100. For example, injection molding may include ABS, thermoplastic elastomers (TPE), thermoplastic vulcanizate (TPV), thermoplastic polyurethane (TPU), PET, ploycarbonates (PC), and/or silicone. A dynamic transaction card 100 may further include a Java Applet 108 and Java Applet integration 110. Although a Java Applet 108 is used through the specification, any other similar type of code application may be used. Moreover, although Java Applet integration 110 is used throughout this specification, any type of interface may be used to allow the microcontroller to interact with the EMV chip. A Java Applet 108 may include code that executes payments, such as payment made using an EMV chip. A Java Applet 108 may include account-provider specific code to execute display functionality specific to the account provider. Java Applet integration 110 may include coded interfaces to allow the microcontroller to interact with the EMV chip 112.

An EMV chip 112 may include a number of contacts that may interact with a terminal configured to read an EMV chip 112. During an EMV transaction, application cryptograms may be used to send and receive data packets between a dynamic transaction card 100 and a terminal, such as a merchant terminal. For example, data packets may include user authentication information which an acquisition system and/or issuing financial institution may use to authenticate a dynamic transaction card 100 during a transaction. Various cryptographic protocols and/or methods may be used in this data transmission and reception process. Moreover, during a transaction issuing financial institutions and/or acquisition systems may return script commands to the EMV chip 112 via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

Dynamic transaction card 100 may also include one or more sensors 114 to receive input. Sensors 114 may include an activation sensor and/or an operation sensor, which may be combined and/or separate. An activation sensor may activate a dynamic transaction card 114 and an operation sensor may instruct a dynamic transaction card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on a dynamic transaction card and/or a password received on a paired mobile device), and/or the like. An operation sensor may change a display 116 based on received input, conduct a transaction via, for example an EMV chip 112 and/or contactless payment technologies based on received input, attempt a pairing of a card 100 and a mobile device, and/or the like.

By way of example, a sensor 114 may include a capacitive touch sensor, a piezoelectric sensor, load cells, a light sensor, a temperature sensor, a resistive touchscreen, including for example an analogue matrix real (AMR) sensors, and/or the like. Sensors 114 may include accelerometers to detect motion input.

Although the sensor 114 is depicted at a particular spot in a dynamic transaction card 100, a sensor 114 may be placed at any portion of the card to detect, for example, touch, light, heat, energy, and/or the like. For example, a sensor may be placed around the outer edges of a dynamic transaction card 100 or at any spot within a dynamic transaction card 100. Sensor 114 also may include the entire exterior surface of dynamic transaction card 100.

A display 116 may be provided within a dynamic transaction card 100. Although the display as shown includes, for example, a dot matrix display, a number of other display options may be included in the dynamic transaction card 200. For example, lighting, such as LED lighting, OLED lighting, and/or the like, may be used as display components. Display components may also include electronic paper, Mirasol, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 116 may be illuminated using a particular color to relay to the cardholder balance information of an account associated with a dynamic transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 116 may include other display component, such as, for example, LCD technology, ePaper technology (e.g., e-ink), vacuum florescent display technology, electroluminescent (EL) technology, and/or the like.

By way of example, a display may include a number of LED or OLED lights that may be lit in a particular pattern to indicate transaction and/or account information. For example, a display may include a circle, semicircle, or other shape of LED or OLED lighting, where the number of lights illuminated indicates a dollar amount or a percentage of the total spending limit, a particular budget, a particular budget category, and/or the like.

A display may be altered and/or modified, for example, depending on which account or card is selected to be used. For example, dynamic transaction card 100 includes a debit account, a first credit account, and a second credit account, display components 116 may reflect the card number, security code, expiration date, and/or other necessary data indicative of the account (e.g., second credit account) that is being used to execute a transaction. A display may be altered and/or modified when, for example, a dynamic transaction card 100 receives new card data and/or new account data from an account holder's mobile device via a wireless connection. For example, where an account has been marked as associated with fraudulent activity, an account holder and/or issuing financial institution may deactivate the card associated with the account and issue a new card. Accordingly, new card data may be transmitted from the issuing financial institution to, for example, an account holder's mobile device via a network, and then from an account holder's mobile device to dynamic transaction card 100 via a wireless connection. A display may also be altered and/or modified when dynamic card 100 activates a new account. For example, when an account holder applies for a new account (e.g., a new credit card account, a new checking account, and/or the like), if approved, new account data may be transmitted to dynamic transaction card 100. New account data may be received at an account holder's mobile device from an issuing financial institution via a network (e.g., using a mobile application, mobile optimized website, and/or the like). New account data may then be transmitted from an account holder's mobile device to dynamic transaction card 100 via a wireless connection (e.g., Bluetooth, optical, audio (e.g., an ultrasonic link), BLE, RFID, NFC, WiFi, and/or the like) or a contact connection (e.g., using a terminal in contact with an EMV chip and/or other microchip).

As described herein, dynamic transaction card 100 may be fully or partially pre-loaded with account and/or card data (e.g., account name(s), account number(s), account expiration data, language preferences, ATM display preferences, mobile application preferences, and/or the like). For example, an applet and placeholder data (or actual data) may be stored within dynamic transaction card 100. Accordingly, when an account holder wishes to activate a new account (e.g., account holder who maintains a first credit account may wish to apply for a second credit account), the new account data and/or activation signal may be received from an account holder's mobile device via a wireless connection or a contact connection (e.g., using a terminal in contact with an EMV chip and/or other microchip) and a new account and/or card may be activated and able to be displayed on dynamic transaction card 100.

A dynamic transaction card 100 may include a display driver 118 that translates instructions from a microcontroller 124 into display images to be displayed using display components 116. A display driver 118 may include an integrated circuit (IC), a state machine, and/or the like that provides an interface function between the display and the microcontroller 124. A display driver 118 may include memory or programmable logic (e.g., RAM, Flash, ROM, and/or the like) and/or firmware that includes font display data.

A dynamic transaction card 100 may include firmware 120 and/or a bootloader 122. A bootloader 122 may include code to be executed as a dynamic transaction card 100 is activated and before any operating system, firmware, or other code is executed on the dynamic transaction card 100. A bootloader may include hardware and/or software that when executed initiates a security jumper interrogation that may disable the dynamic transaction card 100 if connections are not recognized. A security jumper interrogation may delete or alter FLASH or other memory and/or critical NVRAM locations thereby rendering a microprocessor unusable.

A bootloader may be activated via a sensor 114 and energy storage component 128 of a dynamic transaction card 100. Bootloader 122 may be activated and/or load an application and/or program upon detection that card 100 has been inserted into a terminal, charger, and/or the like. Bootloader 122 may be activated using only one technique described herein, using multiple techniques described herein, and/or using a card holder or card provider selected technique(s) described herein. Bootloader 122 may only be active during a short interval after the card 100 powers up. Card 100 may also be activated using program code that may be flashed directly to a microprocessor such as microcontroller 124, EMV chip 112, and/or the like. Card 100 may not use a bootloader 122 but instead may cycle between a sleep state and an active state using program code and/or memory. A dynamic transaction card 200 may include a microcontroller 124 and an antenna 126. Antenna 126 may include, for example, a loop antenna, a fractal antenna, and/or the like. Antenna 126 may transmit to and receive signals from a mobile device to conduct transactions and display data as described throughout the specification. Microcontroller 124 may communicate with EMV chip 112, Java Applet 108, Java Applet integration 110, sensor(s) 114, power management 130, antenna 126, energy storage component 128, display 116, display driver 118, firmware 120, bootloader 122, and/or any other component of dynamic transaction card 100. Microcontroller 124 may control the card operations to conduct transactions and/or display data as described herein. Microcontroller 124 may be connected to an EMV chip and/or processor via plastic jumper connections as described herein.

Dynamic transaction card 100 may include an energy storage component 128. Although energy storage component is depicted as a single component, energy storage component 128 may include a series of energy storage components. By way of example, energy storage component 128 may include a lithium polymer battery, a lithium-metal battery, lithium-ceramic battery, and/or any other type of battery. Energy storage component 128 may be constructed out of rigid materials, semiflexible materials, and/or flexible materials. Energy storage component 128 may provide power to card components contained within dynamic transaction card 100. Energy storage component 128 may be a combined, for example, battery/potting component to support dynamic transaction card 100. Energy storage component 128 may be a combined power component/PCB component as described in U.S. Provisional Patent Application 62/266,324, the entire contents of which are incorporated by reference herein.

Dynamic transaction card 100 may include a power management component 130 that may manage the charging and discharging of storage component 128. Power management component 130 may convert voltage to a predetermined level in order to operate dynamic transaction card 100 as discussed throughout the specification. Power management component 130 and/or energy storage component 128 may include, for example, solar power cells to convert solar energy into an electrical current within a solar panel. Power management component 130 and/or energy storage component 128 may include connections to sensors 114 to receive input and activate dynamic transaction card 100 (e.g., motion input, thermal input, manual input, touch input, and/or the like).

A flexible printed circuit board (PCB) 132 may be included in dynamic transaction card 100. A flexible PCB 132 may include a PCB mounted in a flexible plastic substrate, such as for example, a polyimide, polyether ether ketone, and/or a transparent conductive polyester film. A flexible PCB 132 may be printed, using, for example screen printing, 3D printing, and/or the like, to arrange circuits on a material, such as polyester. Flexible PCB 132 may include electronic components and connections that power dynamic transaction card 100. Flexible PCB 132 may control and/or provide integration between the components of card 100. For example, flexible PCB 132 mechanically supports and electronically connects the electronic components of card 100 using, for example, conductive tracks, pads, and/or other features. A flexible printed circuit (FPC) may be used in place of or in conjunction with flexible PCB 132. FPC 132 may be fabricated with photolithographic technology, such as light exposure of a film material laminated to substrate and/or conductive layers. FPC 132 may be printed, silk-screened, and/or the like. FPC 132 may be used as a structural member for the electronic components of card 100 and/or for the card system as a whole 100.

Dynamic transaction card 100 may include a chassis 134 as a frame or supporting structure. Chassis 134 may be a mount for a flexible PCB 132 and may be constructed out of flexible or semi-flexible material as well. Chassis 134 may be constructed out of a number of materials, including but not limited to, styrene, polycarbonate, polyester and PET. Chassis 134 may be constructed out of a conductive material. Chassis 134 may increase the rigidity of dynamic transaction card 100 to prevent damage. Chassis 134 may also be used to detect if dynamic transaction card 100 is being held by including sensors 114 around chassis 134. Where chassis 134 is constructed out of a conductive material, a dielectric constant of chassis 134 and/or card 100 may be monitored to detect handling of card 100. Chassis 134 may be included within or separate from a card backing 136. Card backing 136 may include a magnetic stripe that may be read using a magnetic stripe reader. A magnetic strip may store tracks of data that are used to conduct a transaction using a dynamic transaction card 100. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, a dynamic transaction card 100 that is paired to a mobile device via, for example, Bluetooth, BLE, RFID, and/or other wireless technologies, may receive new track data. The new track data may be unformatted, encrypted, encoded, and/or the like when the new track data is transmitted from the mobile device to the dynamic transaction card 100. Upon receipt of the new track data, the new track data may be routed to a microprocessor, such as EMV chip 112 and/or microcontroller 124. EMV chip 112 and/or microcontroller 124 may convert, decrypt, and/or decode the received new track data to ensure compliance with any standards. Once decrypted, decoded, and/or formatted, the new track data may be save on the tracks of the magnetic stripe. The magnetic stripe may be deleted and then the new track data may be recorded onto the tracks. In this manner, track data stored on a magnetic stripe may be altered at any time, for example, upon pairing a dynamic transaction card 100 with a mobile device.

Card backing 136 may be made of similar material to that of the output layer 102 and/or the top protective layer 104. Card backing 136 may be made out of a plastic or other materials.

Figure 2:
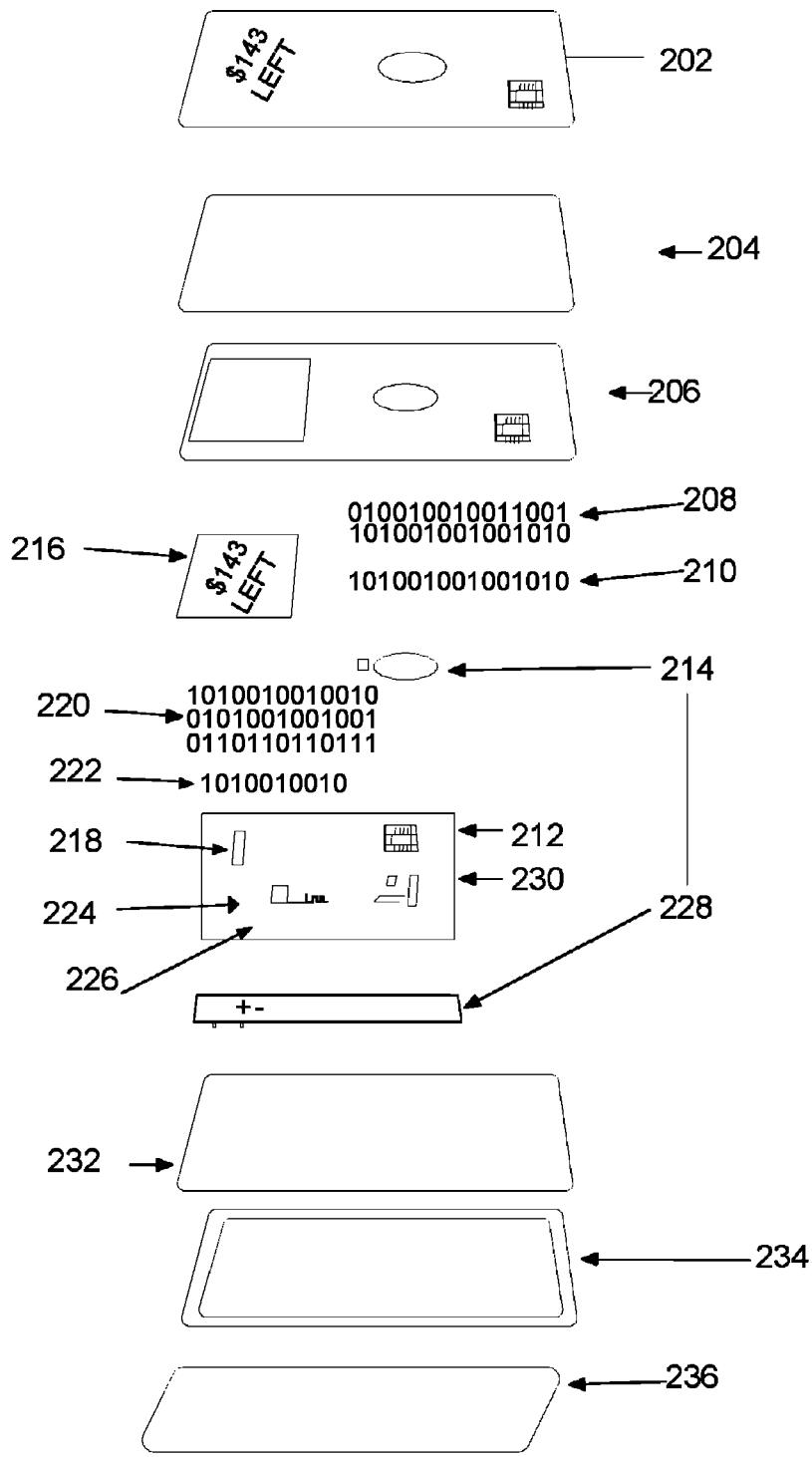
FIG. 2 depicts an example embodiment of a dynamic transaction card according to embodiments of the disclosure.

Although the components of dynamic transaction card 100 are illustrated in a particular fashion, these components may be combined and or placed throughout a dynamic transaction card 100 in any manner, such as those depicted in, for example, FIG. 2.

For example, FIG. 2 illustrates a dynamic transaction card 200 having an output layer 202 which may be similar to output layer 102; an outer protective layer 204 which may be similar to outer protective layer 104; potting 206 which may be similar to potting 106; Java Applets 208 which may be similar to Java Applets 108; Java Applet integration 210 which may be similar to Java Applet integration 110; an EMV chip 212 which may be similar to EMV chip 112; a sensor 214 which may be similar to sensor 114; display 216 which may be similar to display 116; display driver 218 which may be similar to display driver 118; firmware 220 which may be similar to firmware 120; bootloader 222 which may be similar to bootloader 122; microcontroller 224 which may be similar to microcontroller 124; antenna 226 which may be similar to antenna 126; energy storage component 228 which may be similar to energy storage component 128; power management 230 which may be similar to power management 130; a flexible PCB 232 which may be similar to flexible PCB 132; chassis 234 which may be similar to chassis 134; and/or card backing 236 which may be similar to card backing 136.

Figure 3:
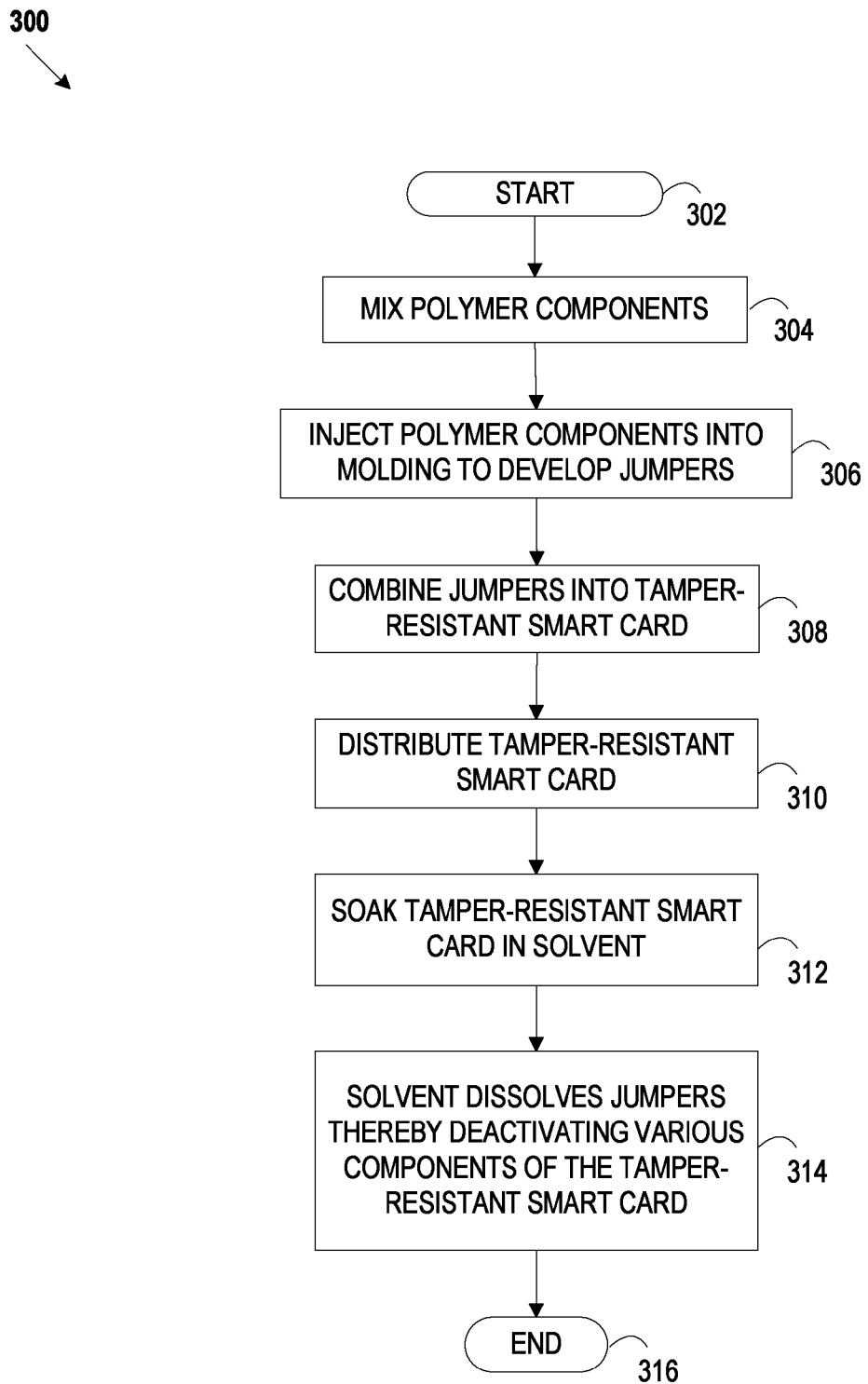
FIG. 3 depicts an example method for using plastic jumpers that will dissolve when in contact with a solvent used to tamper with the dynamic transaction card according to embodiments of the disclosure.

FIG. 3 illustrates an example method 300 for manufacturing and securing a tamper-resistant dynamic transaction card, such as dynamic transaction card 100 or dynamic transaction card 200.

The method may begin at block 302. At block 304, various polymer components may be mixed together to form the material that will become the dissolvable jumpers used as connectors within a dynamic transaction card. This material may include a synthetic or semi-synthetic organic material, such as, for example, polyethylene terephthalate, polyethylene, high-density polyethylene, polyvinyl chloride, polyvinylidene chloride, low-density polyethylene, polypropylene, polystyrene, high impact polystyrene, polyamides, acrylonitrile butadiene styrene, polyethylene/acrylonitrile butadiene styrene polycarbonate, and/or polycarbonate/acrylonitrile butadiene styrene. The dissolvable jumpers may be x-ray transparent.

At block 306, the mixed polymer may be injected into moldings to cure the plastic material and create the jumpers that may be included within a dynamic transaction card. Using a reaction injection molding technique, the jumpers may be irreversibly encapsulated. Reaction injection molding may include injecting the mixture, under a certain pressure, into the molding where the material is then cured. Other molding techniques known in the art may be used to create the plastic jumpers as well. The material used to create the jumpers is a conductive material to enable a connection between the electrical components of a dynamic transaction card.

At block 308, the molded jumpers may be incorporated into the dynamic transaction card. For example, the molding may include a mold for an integrated circuit where the jumpers connect the integrated circuit to, for example a power supply or power management component of the dynamic transaction card. An integrated circuit may include an EMV chip or other integrated circuit within a dynamic transaction card as disclosed herein. The jumpers may also connect a microprocessor or microcontroller to an EMV chip, a microprocessor or microcontroller to a power supply, a microprocessor or microcontroller to a power management component, and/or any other components as discussed above with respect to dynamic transaction card 100 or 200. In this manner, various components or portions of components (e.g., the $V_{cc}$ component of an integrated circuit) may be connected using the created plastic jumpers. The jumpers may be arranged in a sequence. When a dynamic transaction card is turned on, the card will look for the sequence. If one or more of the jumpers have been dissolved and the sequence cannot be found, the dynamic transaction card may be deactivated and/or the memory of the card may be erased.

The dynamic transaction card may then be manufactured accordingly so that the various layers of the card may be molded together. The top and bottom layers, such as the outer protective layer and card backing layer described with respect to FIGS. 1 and 2, may be constructed out of a plastic material as well. At block 310, card provider may distribute the tamper-resistant card for use. Once distributed, a card may be vulnerable to theft, loss, or attempted reengineering. Accordingly, manufacturing a dynamic transaction card as described herein provides a secure, tamper-resistant card.

At block 312, a dynamic transaction card may be tampered with, for example, to obtain the data stored on the card and/or reverse engineer the dynamic transaction card. In order to tamper with a dynamic transaction card, the outer layers must be dissolved so that the internal components may be exposed and examined. Dissolving the outer layers may include, for example, soaking or otherwise moistening the layers with a solvent. A solvent may include any solvent capable of dissolving or breaking down a plastic material. For example, a solvent may include acetaldehyde, acetic acid, acetone, amyl acetate, aniline, benzene, bromine, butanol, butyric acid, carbon tetrachloride, chloral hydrate, chlorine, chloroform, chlorosuphonic acid, cyclohexanone, ethyl acetate, ethylene dichloride, ethylene glycol, hydrofluoric acid, methyl ethyl ketone, methyl chloride, naphthalene, ozone, phenol, sulphuric acid, toluene, trichlorethlyene, turpentine, and/or xylene. Most commonly solvents such as acetone and/or toluene are used to break down or dissolve the outer layer material associated with a dynamic transaction card.

At block 314, the solvent may dissolve all plastic material associated with the dynamic transaction card, including the outer layers as well as the jumpers that have been created. By breaking down and/or dissolving the material making up the jumpers, the connections between various components are broken down. Accordingly, the various components of a dynamic transaction card may be deactivated thereby prohibiting tampering and/or reverse engineering of a dynamic transaction card.

The method may end at block 316.

Various embodiments of the present disclosure provide a dynamic transaction card that is manufactured using conductive plastic jumpers that will dissolve when in contact with a solvent used to tamper with the dynamic transaction card. A dynamic transaction card may include an embedded microprocessor chip, or integrated circuit (IC), including various components to provide card capabilities, such as transaction capabilities, security capabilities, and reprogramming capabilities. se components may be understood to refer to computer executable software, firmware, hardware, and/or various combinations thereof. A dynamic transaction card may include a number of layers including a transparent overlay and backing that encapsulate a number of components, both hardware and software, such as, for example, potting, Java Applets, Java Applet integration, an EMV chip, a sensor, a display, display driver, firmware, a bootloader, a microcontroller an antenna, an energy storage component, power management, a flexible PCB, and a chassis.

Internal components of a dynamic transaction card may be manufactured using a synthetic or semi-synthetic organic material, such as, for example, polyethylene terephthalate, polyethylene, high-density polyethylene, polyvinyl chloride, polyvinylidene chloride, low-density polyethylene, polypropylene, polystyrene, high impact polystyrene, polyamides, acrylonitrile butadiene styrene, polyethylene/acrylonitrile butadiene styrene polycarbonate, and/or polycarbonate/acrylonitrile butadiene styrene. These materials may be conductive to provide functionality to a dynamic transaction card, such as a connection between an integrated circuit and other card components such that when the materials dissolve, the connections are broken and the dynamic transaction card may be inactive due to the loss of various connections.

A dynamic transaction card that includes these conductive, plastic jumpers connecting, for example, an integrated circuit to a power supply, may be manufactured using reaction injection molding (RIM). In this manner, thermosetting polymers (e.g., plastics) are cured irreversibly. As used herein, irreversible curing means that once hardened, the resin cannot be reheated, melted, and reshaped. Using a RIM process, the various polymer components used to form the conductive, plastic jumpers in a dynamic transaction card may be combined and injected into a molding. Reinforcing agents may be added to the mixture, such as various fibers or mica. The materials mixed in the molding may then be cured while remaining in the molding.

Once cured, the molded jumpers may then be incorporated into a dynamic transaction card as connectors between, for example, an integrated circuit and a power supply or power management. Should the card be tampered with using, for example, a solvent to dissolve the plastic outer layers of the dynamic transaction card, the jumpers will also dissolve thereby preventing reverse engineering of or tampering with the dynamic transaction card.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative

The invention claimed is:

1. A dynamic transaction card comprising:
   an outer layer comprising a plastic material;
   electrical components;
   a plurality of connectors between the electrical components, wherein:
      the connectors are constructed from a conductive, dissolvable material;
      the connectors are arranged in a sequence, wherein the dynamic transaction card will look for the sequence to activate the card; and
      upon dissolving the outer layer using a solvent, the connectors are dissolved to break the connection between the electrical components and the sequence to deactivate the dynamic transaction card.

2. The dynamic transaction card of claim 1, wherein the electrical components comprise an integrated circuit, power supply, power management component, microprocessor, microcontroller, and/or a EuroPay-MasterCard-Visa (EMV) chip.

3. The dynamic transaction card of claim 2, wherein the connectors connect the integrated circuit to the power supply and/or power management component.

4. The dynamic transaction card of claim 2, wherein the connectors connect the microprocessor and/or microcontroller to the power supply and/or power management component.

5. The dynamic transaction card of claim 1, wherein the plastic material comprises polyethylene terephthalate, polyethylene, high-density polyethylene, polyvinyl chloride, polyvinylidene chloride, low-density polyethylene, polypropylene, polystyrene, high impact polystyrene, polyamides, acrylonitrile butadiene styrene, polyethylene/acrylonitrile butadiene styrene polycarbonate, and/or polycarbonate/acrylonitrile butadiene styrene.

6. The dynamic transaction card of claim 1, wherein a mixed polymer is injected into moldings to irreversibly cure the plastic material to create the connectors.

7. The dynamic transaction card of claim 6, wherein the connectors are manufactured using reaction injection molding.

8. The dynamic transaction card of claim 6, wherein reinforcing agents are added to the mixed polymer.

9. The dynamic transaction card of claim 8, wherein the reinforcing agents comprise fiber and/or mica.

10. The dynamic transaction card of claim 1, further comprising a backing layer, wherein the backing layer and the outer layer are molded together.

11. The dynamic transaction card of claim 10, wherein the backing layer comprises a plastic material.

12. The dynamic transaction card of claim 1, wherein the connectors are x-ray transparent.

* * * * *